US011506077B2

(12) United States Patent
Pritchard, Jr. et al.

(10) Patent No.: US 11,506,077 B2
(45) Date of Patent: Nov. 22, 2022

(54) INFLATABLE DEVICE WITH GUIDING MECHANISM FOR EFFECTIVE ENGINE CLEANING

(71) Applicant: General Electric Company, Schenectady, NY (US)

(72) Inventors: Byron Andrew Pritchard, Jr., Loveland, OH (US); Deepak Trivedi, Niskayuna, NY (US); Ambarish Jayant Kulkarni, Glenville, NY (US); Michael Robert Millhaem, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/167,435

(22) Filed: Feb. 4, 2021

(65) Prior Publication Data

US 2022/0243612 A1 Aug. 4, 2022

(51) Int. Cl.
*F01D 25/00* (2006.01)
*B08B 9/00* (2006.01)
*B08B 3/00* (2006.01)

(52) U.S. Cl.
CPC ............ *F01D 25/002* (2013.01); *B08B 3/003* (2013.01); *B08B 9/00* (2013.01); *F05D 2230/72* (2013.01)

(58) Field of Classification Search
CPC ... F01D 25/002; F05D 2230/72; B08B 3/003; B08B 9/00
See application file for complete search history.

(56) References Cited

U.S. PATENT DOCUMENTS

| 2,366,164 | A | 1/1945 | Weick et al. |
| 6,206,067 | B1 | 3/2001 | Kociemba et al. |
| 6,270,603 | B1 | 8/2001 | Westerman et al. |
| 6,491,048 | B1 | 12/2002 | Foster |
| 6,503,334 | B2 | 1/2003 | Ruiz et al. |
| 6,542,230 | B1 | 4/2003 | Luke |
| 6,640,437 | B2 | 11/2003 | McFarland |
| 6,671,938 | B2 | 1/2004 | McFarland |

(Continued)

FOREIGN PATENT DOCUMENTS

| EP | 3213865 | 9/2017 |
| EP | 3222751 | 9/2017 |

*Primary Examiner* — Sharidan Carrillo
(74) *Attorney, Agent, or Firm* — Fitch, Even, Tabin & Flannery LLP

(57) ABSTRACT

An inflatable device equipped with a guiding mechanism and methods of installing the inflatable device to form a temporary barrier within a gas turbine engine are provided. In one aspect, an inflatable device includes a backbone and an inflatable bladder connected thereto. The backbone is formed of a flexible and inextensible material. The inflatable bladder is formed of an expandable material. To install the inflatable device within an annular chamber of a gas turbine engine, the backbone is inserted into a first access port of the engine and is moved circumferentially around the annulus of the chamber. The backbone is retrieved through a second access port. The inflatable bladder is moved into position within the chamber by pushing the backbone into the first access port and/or pulling the backbone out of the second access port. When positioned in place, the inflatable bladder is inflated to form an annular seal.

16 Claims, 8 Drawing Sheets

(56) References Cited

U.S. PATENT DOCUMENTS

| | | |
|---|---|---|
| 7,032,279 B2 | 4/2006 | McCarvill et al. |
| 7,278,208 B2 | 10/2007 | Le Saint et al. |
| 7,523,764 B2 | 4/2009 | Lepola |
| 7,588,053 B2 | 9/2009 | Lundman |
| 7,810,696 B2 | 10/2010 | Nunnery |
| 8,801,502 B2 | 8/2014 | Ng et al. |
| 8,927,897 B2 | 1/2015 | Xu et al. |
| 8,991,047 B2 | 3/2015 | Anasis et al. |
| 9,821,349 B2 | 11/2017 | Griffiths et al. |
| 9,970,326 B2 | 5/2018 | Roberts et al. |
| 10,173,250 B2 | 1/2019 | Files |
| 10,344,617 B2 | 7/2019 | Domalain et al. |
| 2006/0042083 A1 | 3/2006 | Baker et al. |
| 2006/157906 A1 | 7/2006 | Clark |
| 2013/0199040 A1 | 8/2013 | Dudeck et al. |
| 2015/0001086 A1 | 1/2015 | Dimascio et al. |
| 2015/0034266 A1 | 2/2015 | Bruck et al. |
| 2015/0174838 A1 | 6/2015 | Kittleson et al. |
| 2015/0197712 A1* | 7/2015 | Ekanayake ............... C11D 7/34 427/299 |
| 2016/0032743 A1 | 2/2016 | Duchaine |
| 2016/0067750 A1* | 3/2016 | Griffiths ............... B01F 5/0406 134/22.18 |
| 2017/0276024 A1* | 9/2017 | Diwinsky ............... F01D 5/005 |
| 2018/0202449 A1* | 7/2018 | Bifulco ................. F01D 11/001 |
| 2018/0299053 A1* | 10/2018 | Jacobs .................. F16L 37/091 |
| 2018/0313225 A1 | 11/2018 | Millhaem et al. |
| 2020/0025649 A1* | 1/2020 | Stowe ....................... B08B 9/00 |
| 2020/0191172 A1 | 6/2020 | Norton |

\* cited by examiner

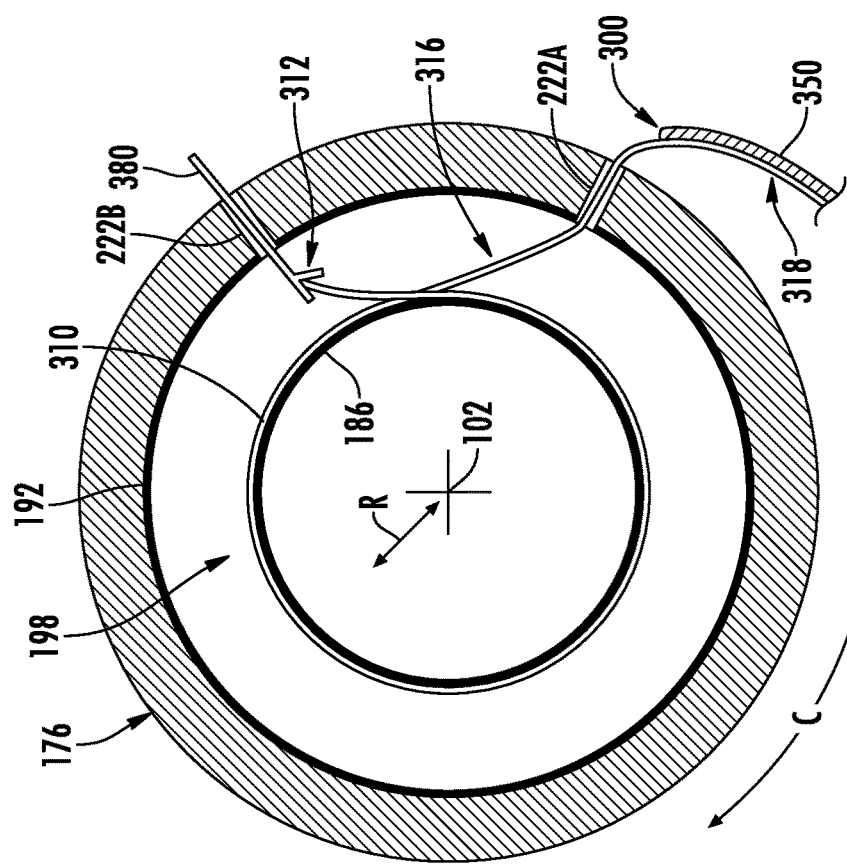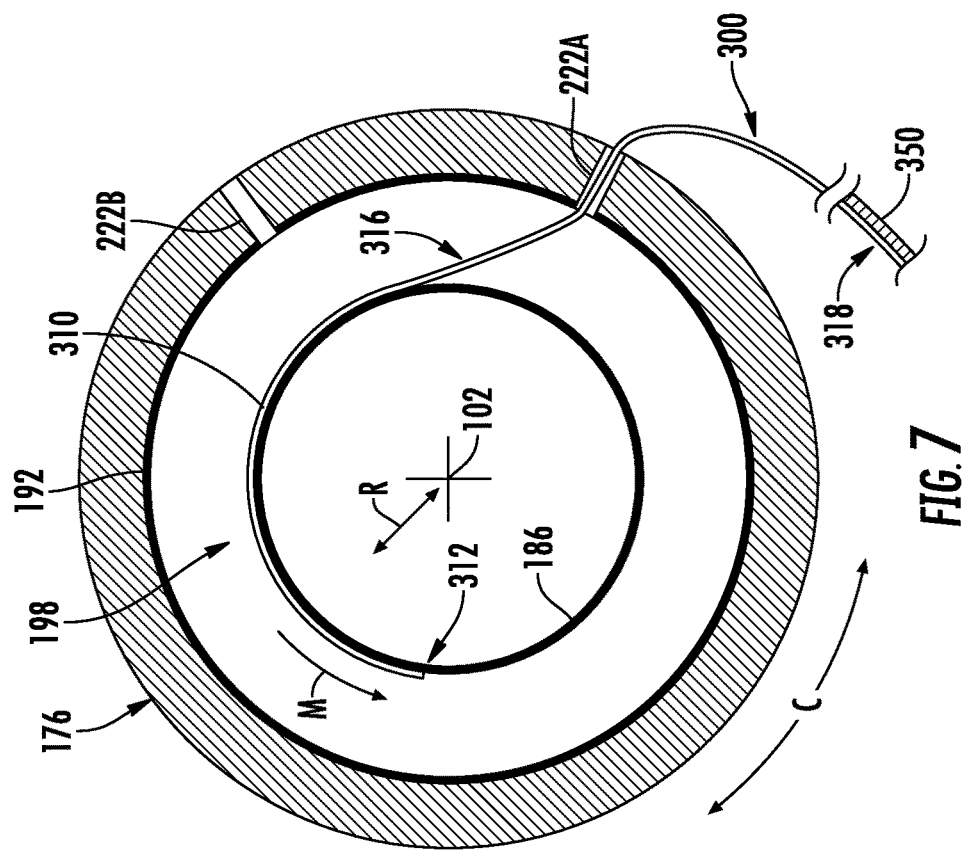

INFLATABLE DEVICE WITH GUIDING MECHANISM FOR EFFECTIVE ENGINE CLEANING

FIELD

The present subject matter relates generally to gas turbine engines, and more particularly, to an inflatable device and methods of using the inflatable device to form an in situ temporary barrier within a gas turbine engine.

BACKGROUND

Gas turbine engines are periodically cleaned to remove environmental and self-generated contaminants, including films, particulates, grime, metals and combustion products deposited in the compressors, combustion, and/or turbine sections of an engine. For instance, sometimes aviation gas turbine engines undergo "online" or on-wing foam cleanings. Foam cleaning an engine can increase the engine cycle efficiency, which reduces the exhaust gas temperature of the engine. Consequently, fuel consumption can be reduced and engine time-on-wing can be extended. Foam sprayed or otherwise introduced into the engine can flow through certain sections of a core of the engine to clean various components thereof. The inventors of the present disclosure have invented an inflatable device and methods of using the inflatable device to facilitate cleanings of gas turbine engines, such as foam cleanings.

BRIEF DESCRIPTION

Aspects and advantages of the invention will be set forth in part in the following description, or may be obvious from the description, or may be learned through practice of the invention.

In one aspect, a method of forming an in situ temporary barrier within a gas turbine engine is provided. The method includes installing an inflatable device within the gas turbine engine, the inflatable device having a backbone and an inflatable bladder connected to the backbone. Further, the method includes inflating the inflatable bladder with an inflating fluid such that the inflatable bladder forms a seal along a fluid path of the gas turbine engine.

In another aspect, an inflatable device for forming an in situ temporary barrier within a gas turbine engine is provided. The inflatable device includes a backbone and an inflatable bladder connected longitudinally to the backbone and operable to receive an inflating fluid, the inflatable bladder being formed of an expandable or foldable material.

In yet another aspect, a method of forming an in situ temporary barrier within a gas turbine engine is provided. The method includes installing an inflatable device within an annular chamber defined by the gas turbine engine, the inflatable device having a backbone and an inflatable bladder connected to the backbone, the inflatable bladder being formed of an expandable or foldable material. Installing the inflatable device within the annular chamber includes guiding a free section of the backbone through a first access port of the gas turbine engine and circumferentially through the annular chamber, the free section of the backbone being a section of the backbone along which the inflatable bladder is not connected; retrieving a portion of the free section of the backbone through a second access port of the gas turbine engine so that the portion of the free section is positioned external to the annular chamber; and moving the inflatable device by performing at least one of pulling on the portion of the free section extending from the second access port external to the annular chamber and pushing on a portion of the inflatable device extending from the first access port external to the annular chamber so that the inflatable bladder extends annularly or substantially annularly within the annular chamber. Further, the method includes inflating the inflatable bladder with an inflating fluid such that the inflatable bladder forms an annular seal within the annular chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 7 through 10 provide schematic axial cross-sectional views of an inflatable device being installed and inflated within a gas turbine engine in accordance with the method of FIG. 6.

DETAILED DESCRIPTION

Figure 1:
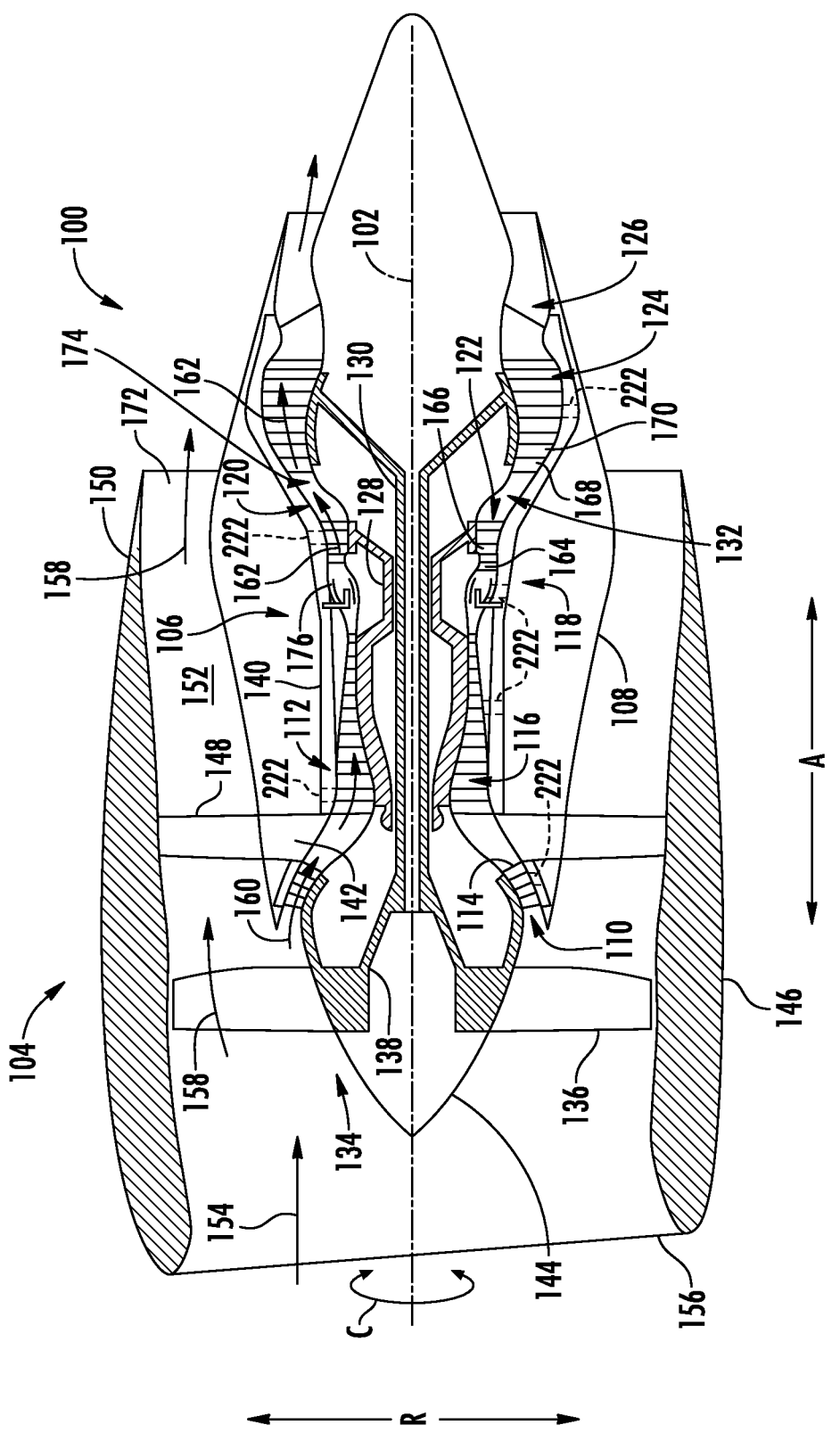
FIG. 1 provides a schematic cross-sectional view of an exemplary aviation gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is a direction toward the longitudinal axis and radially outward is a direction away from the longitudinal axis.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Aspects of the present disclosure are directed to an inflatable device equipped with a guiding mechanism and methods of installing the inflatable device to form an in situ temporary barrier within a gas turbine engine. Such an inflatable device can facilitate cleaning of a gas turbine engine. Particularly, the inventors have recognized that one challenge with foam cleaning a gas turbine engine is that foam tends to not penetrate and clean the small secondary cooling passages of the combustor and turbine modules of the engine. Instead, the foam tends to partially accumulate and collapse into liquid within the combustor volume and partially flows into the combustor chamber and through the turbine flowpath, but results in little foam flowing through inner cavities and passages of turbine nozzles, shrouds, and blades within the turbine section. Accordingly, the inventors have invented an inflatable device that can be positioned within a gas turbine engine to facilitate cleaning thereof, and more particularly, to facilitate cleaning of areas that have traditionally been difficult to clean, such as inner cavities and passages of components positioned within a turbine section of an engine.

In one aspect, an inflatable device includes a backbone and an inflatable bladder connected thereto. The backbone can be formed of a material that allows for conformal bending of the backbone, e.g., to a surface to which it slidingly contacts, and that is inextensible under tension. Stated another way, the backbone can be formed of a flexible and inextensible material. The backbone can be flexible in that it may bend to conform to the contour of a surface, such as a curved surface of an inner liner of a combustor. However, the flexible backbone can have a stiffness such that the backbone does not buckle or collapse when moved, e.g., when pushed. The backbone can be inextensible in that the backbone does not stretch (or stretches to negligible effect) when placed under tension. In this regard, when the backbone is pulled, immediate motion or movement of the backbone results. The inflatable bladder is formed of an expandable material or as a folded bag. In this way, when inflatable bladder is inflated with an inflating fluid, the inflatable bladder can expand or unfold to form a seal along a fluid path of the gas turbine engine. The seal formed by the inflatable bladder can be an annular seal, for example.

The backbone extends longitudinally between a first end and a second end. The inflatable bladder also extends longitudinally between a first end and a second end. The inflatable bladder is connected along its longitudinal length to the backbone. The backbone can include a bladder support section to which the inflatable bladder is connected. The backbone also includes one or more "free" sections or segments to which the inflatable bladder is not connected. For instance, the backbone can include a free section spanning from the first end of the backbone to the bladder support section and a free extension section spanning from the second end of the backbone to the bladder support section. In this regard, the bladder support section is positioned between the free section and the free extension section.

In some embodiments, the free section can extend longitudinally at least the longitudinal length of the inflatable bladder. In other embodiments, the free section can extend longitudinally at least half the longitudinal length of the inflatable bladder. The backbone can be formed as a single continuous part or can be formed of segments connected by a connection members, such as hinges. The backbone can have any suitable cross-sectional shape. For instance, the backbone can have a non-circular cross section, such as a rectangular cross section. In some embodiments, the backbone has at least one flat or planar surface. In such embodiments, the flat surface is a surface opposite the surface of the backbone to which the inflatable bladder is connected. The cross section of the backbone is sized so that the backbone and the inflatable bladder can be received within an access port.

To install the inflatable device within an annular chamber of a gas turbine engine, such as an annular combustion chamber of a combustor thereof, the first end of the backbone is inserted into a first access port of the engine and the free section is moved circumferentially around the annulus of the chamber. That is, the free section can be moved such that the first end of the backbone traverses at least three hundred sixty degrees (360°) within the annular chamber. In this manner, the free section of the backbone is guided through the first access port of the gas turbine engine and circumferentially through the annular chamber. After traversing annularly through the combustion chamber, the first end of the backbone is retrieved through a second access port axially aligned with and spaced circumferentially from the first access port. The first and second access ports can be igniter ports, for example. A tool, such as a spring-loaded claw, can be inserted through the second access port and used to grasp the free section of the backbone. The tool can be used to retrieve or pull the first end of the backbone out of the combustion chamber through the second access port. Other tools for retrieving the backbone are contemplated. As one example, a hook can be used to retrieve a nitinol loop attached to an end of the backbone. As another example, a magnetic leader or material can be attached to or made integral with the backbone and a magnet tool can be used to retrieve the backbone by attracting the magnetic leader.

In some implementations, the inflatable bladder is moved into position within the annular chamber by grasping the free extension section and pushing the backbone and inflatable bladder connected thereto further into the first access port and/or pulling the free section of the backbone further out of the second access port. The pushing and pulling action moves the inflatable bladder circumferentially around the annulus of the combustion chamber. When positioned in place, the inflatable bladder is inflated with an inflating fluid, such as compressed air. The inflatable bladder inflates to form a seal, which acts as a temporary in situ barrier along the core air flowpath of the gas turbine engine. The seal can be an annular seal, for example. With the inflatable bladder inflated to form the annular seal, one or more service operations can be performed. For instance, a foam cleaning operation can be performed with the inflatable bladder inflated to form the annular seal, which may ultimately lead to a more effective foam cleaning, especially of the turbine section. Particularly, the annular seal formed by the inflatable bladder can prevent foam from entering and accumulating in the combustion chamber, which ultimately increases the volume of foam flowing into internal cavities of components of the turbine section positioned downstream of the combustion section. In some embodiments, the annular seal can block at least fifty percent (50%) of the working fluid (e.g., foam volume) from passing thereby. In some embodiments, the annular seal can block at least 70 percent (70%) of the working fluid from passing thereby. In yet other embodiments, the annular seal can block at least 90 percent (90%) of the working fluid from passing thereby. In further embodiments, the annular seal can block 100 percent (100%) of the working fluid from passing thereby.

In some alternative embodiments, the backbone can be inserted through an access port, guided annularly through the chamber, and retrieved from the same access port. In such embodiments, the inflatable bladder can be moved into position within the annular chamber by pushing the backbone and inflatable bladder connected thereto further into the access port and/or pulling the free section of the backbone further out of the same access port. In other embodiments, the backbone can be inserted through an access port and guided into the chamber without needing to be retrieved through an access port.

Referring now to the drawings, FIG. 1 provides a schematic cross-sectional view of a gas turbine engine 100 in accordance with an exemplary embodiment of the present subject matter. For the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, for reference, the gas turbine engine 100 defines an axial direction A that extends parallel to or coaxial with a longitudinal centerline 102 of the gas turbine engine 100, a radial direction R, and a circumferential direction C that extends around the longitudinal centerline 102 three hundred sixty degrees.

The gas turbine engine 100 includes a fan section 104 and a core engine 106 disposed downstream from the fan section 104. The core engine 106 includes a substantially tubular core cowl 108 that defines an annular core inlet 110. The core cowl 108 encases, in a serial flow relationship, a compressor section 112 including a booster or LP compressor 114 and an HP compressor 116; a combustion section 118; a turbine section 120 including an HP turbine 122 and an LP turbine 124; and a jet exhaust nozzle section 126. An HP shaft or spool 128 drivingly connects the HP turbine 122 to the HP compressor 116. An LP shaft or spool 130 drivingly connects the LP turbine 124 to the LP compressor 114. The compressor section 112, combustion section 118, turbine section 120, and jet exhaust nozzle section 126 together define a core air flowpath 132 through the core engine 106.

The fan section 104 includes a fan 134 having a plurality of fan blades 136 coupled to a fan rotor 138 in a circumferentially spaced apart manner. The fan blades 136 and the fan rotor 138 are together rotatable about the longitudinal centerline 102. The fan rotor 138 can be operatively coupled with the LP shaft 130 or can form a part thereof. As one example, the fan rotor 138 can be operatively coupled with the LP spool 130 in a direct drive configuration. As another example, the fan rotor 138 can be operatively coupled with the fan rotor 138 across a gear box. The fan section 104 also includes a rotatable spinner or front nacelle 144 aerodynamically contoured to promote an airflow through the plurality of fan blades 136. In addition, the fan section 104 includes an annular fan casing or outer nacelle 146 that circumferentially surrounds the fan 134 and/or at least a portion of the core engine 106. The nacelle 146 is supported relative to the core engine 106 by a plurality of circumferentially spaced outlet guide vanes 148. Further, a downstream section 150 of the nacelle 146 extends over an outer portion of the core engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the annular core inlet 110 and into the LP compressor 114. The pressure of the second portion of air 160 is then increased as it is routed through the HP compressor 116 and into the combustion section 118.

The compressed second portion of air 160 from the compressor section mixes with fuel and is burned within a combustion chamber 198 (FIG. 2) defined by a combustor 176 positioned within the combustion section 118 to provide combustion gases 162. The combustion gases 162 are routed from the combustion section 118 along a hot gas path 174 through the HP turbine 122 where a portion of thermal and/or kinetic energy from the combustion gases 162 is extracted via sequential stages of HP turbine stator vanes 164 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the core engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define the hot gas path 174 for routing the combustion gases 162 through the core engine 106.

As further shown in FIG. 1, the gas turbine engine 100 can include a plurality of access ports defined through its casings and/or frames for providing access to the interior of the core engine 106. For instance, the gas turbine engine 100 can include a plurality of access ports 222 (only six of which are shown in FIG. 1) defined through its casings 140 for providing internal access to one or both of the compressors 114, 116, to one or both of the turbines 122, 124, and/or the combustor 176 of the combustion section 118. The core cowl 108 can be opened to expose the case or casings 140 so as to provide access to the access ports 222.

In some embodiments, the access ports 222 may be spaced apart along the core engine 106 along the axial direction A. For instance, the access ports 222 may be spaced apart along each compressor 114, 116, the combustor 176, and/or each turbine 122, 124 along the axial direction A such that at least one access port 222 is located at each compressor stage, the combustor 176, and/or each turbine stage for providing access to the internal components located at such stage(s). In addition, the access ports 222 may also be spaced apart around the core engine 106 along the circumferential direction C. For instance, a plurality of access ports 222 may be spaced apart circumferentially around each compressor stage, the combustor 176, and/or turbine stage. The access ports 222 providing access to the combustor 176 can be igniter ports, for example. In some embodiments, the igniter ports can have less than a one inch diameter. It should be appreciated that, although the access ports 222 are generally described herein with reference to providing internal access to one or both of the compressors 114, 116, the combustor 176, and/or to one or both of the turbines 122, 124, the gas turbine engine 100 may include access ports 222 providing access to any suitable internal location of the engine 100.

Further, it will be appreciated that the exemplary gas turbine engine 100 depicted in FIG. 1 is provided by way of example only, and that in other exemplary embodiments, the gas turbine engine 100 may have any other suitable configuration. Additionally or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

Figure 2:
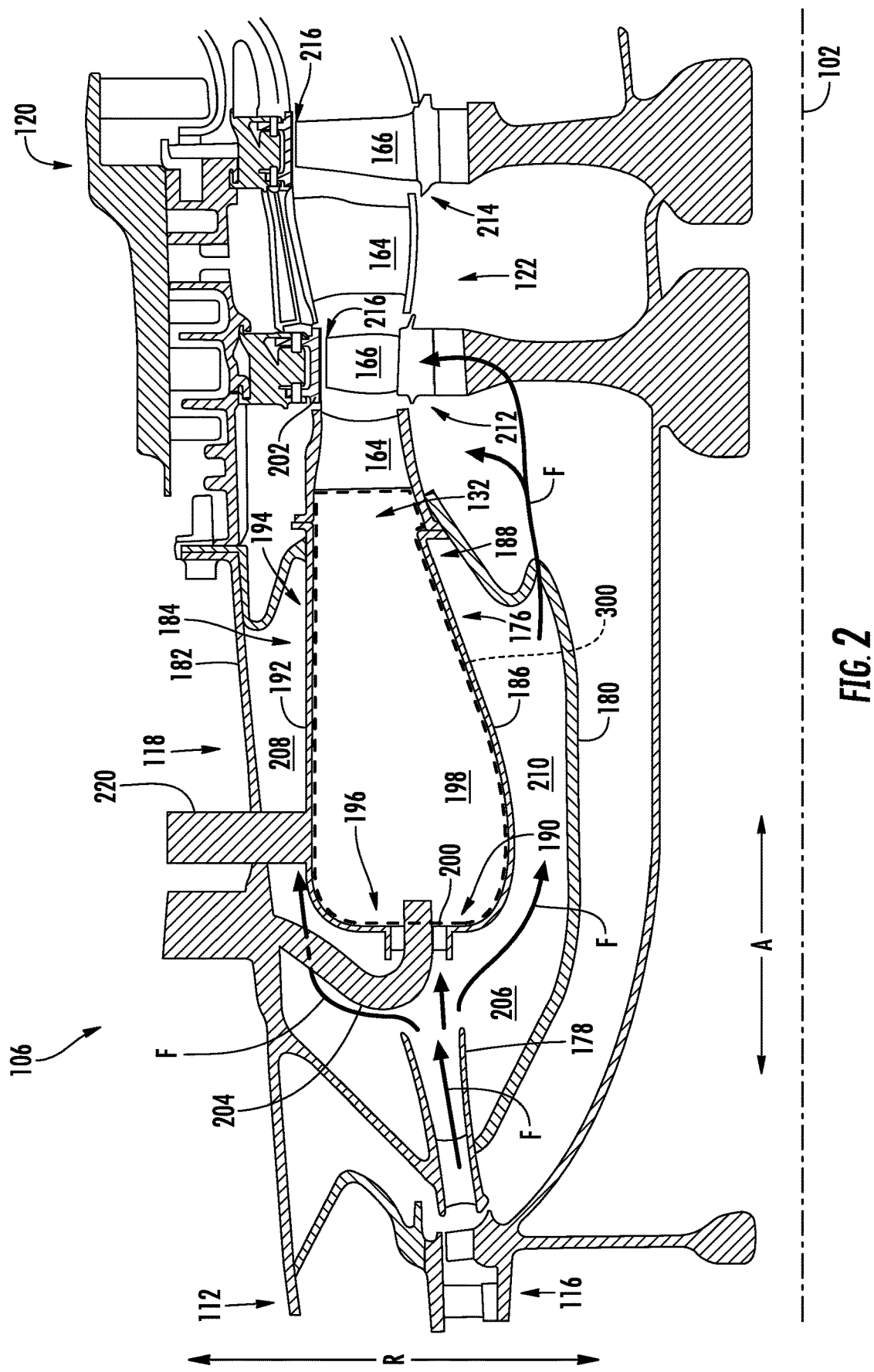
FIG. 2 provides a schematic cross-sectional view of an aft end of a compressor section, a combustion section, and a high pressure turbine section of the gas turbine engine of FIG. 1.

FIG. 2 provides a schematic cross-sectional view of the aft stage of the compressor section 112, the combustion section 118, and the turbine section 120 of the core engine 106 of FIG. 1. More specifically, the aft end of the HP compressor 116, the combustion section 118, and the HP turbine 122 are illustrated in FIG. 2.

As depicted in FIG. 2, the HP compressor 116 includes a diffuser 178 at its aft or downstream end. During operation of the gas turbine engine 100 (FIG. 1), compressed air exits the HP compressor 116 through the diffuser 178. The diffuser 178 diffuses the compressed air into the combustion section 118. Further, as will be explained below, during a foam cleaning of the gas turbine engine 100 (FIG. 1), foam can exit the HP compressor 116 through the diffuser 178 and flow downstream into the combustion section 118.

The combustion section 118 of the core engine 106 is annularly encased by radially inner and outer combustor casings 180, 182. The inner combustor casing 180 and the outer combustor casing 182 both extend longitudinally or lengthwise along the axial direction A and surround a combustor assembly 184 in annular rings. The inner and outer combustor casings 180, 182 are joined together at annular diffuser 178 at the forward end of the combustion section 118.

The combustor assembly 184 includes an inner liner 186 and an outer liner 192. The inner liner 186 extends between an aft end 188 and a forward end 190 along the axial direction A. The outer liner 192 also extends between an aft end 194 and a forward end 196 along the axial direction A. The outer liner 192 is positioned outward of the inner liner 186 along the radial direction R. The inner and outer liners 186, 192 together form the combustor 176 and at least partially define a combustion chamber 198 therebetween. The inner and outer liners 186, 192 are attached to a forward radial wall 200, which is often referred to as a dome or dome plate of the combustor 176.

The combustor assembly 184 further includes a plurality of fuel nozzles 204 (only one shown in FIG. 2) spaced along the circumferential direction C and positioned at least partially within respective openings defined by the forward radial wall 200. More particularly, the plurality of fuel nozzles 204 are disposed at least partially in respective openings of the forward radial wall 200 along the radial direction R. During operation, compressed air from the compressor section 112 of the gas turbine engine 100 flows around or through the fuel nozzles 204 where the compressed air is mixed with fuel and ignited to create combustion gases 162 (FIG. 1) within the combustion chamber 198. The combustor assembly 184 includes a plurality of igniters 220 (only one shown in FIG. 2) spaced from one another along the circumferential direction C. The igniters 220 facilitate ignition of the compressed air/fuel mixture within the combustion chamber 198.

In addition, the core engine 106 defines a plenum 206 surrounding the combustor assembly 184. Particularly, the plenum 206 is generally defined between the combustor casings 180, 182 and the liners 186, 192. The outer combustor casing 182 and the outer liner 192 define an outer plenum 208 generally disposed outward of the combustion chamber 198 along the radial direction R. The inner combustor casing 180 and the inner liner 186 define an inner plenum 210 generally disposed inward of the combustion chamber 198 along the radial direction R.

The HP turbine 122 of the turbine section 120 includes sequential stages of HP turbine stator vanes 164 and HP turbine rotor blades 166. For this embodiment, the HP turbine 122 includes two stages, including a first stage 212 and a second stage 214. The first stage 212 has an annular array of first stage HP turbine stator vanes 164 disposed immediately downstream of the combustion chamber 198 and an annular array of first stage HP turbine rotor blades 166 disposed immediately downstream of the first stage HP turbine stator vanes 164. The second stage 214 has an annular array of second stage HP turbine stator vanes 164 disposed immediately downstream of the first stage HP turbine rotor blades 166 and an annular array of second stage HP turbine rotor blades 166 disposed immediately downstream of the second stage HP turbine stator vanes 164. Notably, the HP turbine stator vanes 164 and HP turbine rotor blades 166 of the two stages 212, 214 can include various inner cavities, passages, fluid circuits, etc. Such inner cavities can provide cooling to the HP turbine stator vanes 164 and HP turbine rotor blades 166 during operation, for example. In addition, the first stage turbine shroud 202 can include various cavities, passages, fluid circuits, etc., e.g., for cooling purposes.

With reference now to FIGS. 1 and 2, during a foam cleaning of the gas turbine engine 100, a foam solution or foam F (FIG. 2) can be introduced into the gas turbine engine 100, e.g., through one or more of the compressor access ports with the HP shaft 128 in rotation. The foam F can flow downstream through the LP compressor 114 and/or the HP compressor 166 depending on the access port or ports through which the foam is introduced. The foam F can exit the HP compressor 166 through the diffuser 178 and can flow into the plenum 206.

In accordance with the inventive aspects of the present disclosure, an inflatable device 300 (represented by dashed lines in FIG. 2) can be installed and inflated to form an in situ temporary barrier or annular seal to prevent foam F from flowing into the annular combustion chamber 198 during a cleaning operation. Accordingly, the foam F is forced to flow elsewhere. Particularly, a portion of the foam F is forced to flow into the inner plenum 210. The portion of foam F flowing in the inner plenum 210 flows downstream along the axial direction A and eventually reaches the HP turbine 120 of the turbine section 118. As depicted, the foam F can flow into the inner cavities (not shown or labeled) of the HP turbine stator vanes 164 and HP turbine rotor blades 166 of the first stage 212. As a result, the inner cavities of the HP turbine stator vanes 164 and HP turbine rotor blades 166 can be effectively cleaned with the foam F. In addition, by sealing off the combustion chamber 198 with the inflatable device 300, a portion of the foam F can be forced to flow outward into the outer plenum 208 along the radial direction R. The portion of foam F flowing in the outer plenum 208 flows downstream along the axial direction A and eventually reaches the HP turbine 120 of the turbine section. The foam F can flow into and/or through other cavities of interest (not shown or labeled), such as cooling cavities of the shroud 202 or shroud segments thereof annularly encasing the HP turbine rotor blades 166.

The inflatable device 300 can be installed through any suitable access port, such as one of the access ports 222 providing internal access to the combustor 176 shown in FIG. 1. For instance, the access port providing access to the combustor 176 can be an igniter port, for example. Once installed, the inflatable device 300 can be inflated with an inflating fluid (e.g., compressed air) to form an annular seal as will be explained below. In some embodiments, the inflatable device 300 can be installed, inflated to form an annular seal, and then left in place for the duration of the cleaning operation, e.g., for effective cleaning of the turbine components. In other embodiments, the inflatable device 300 can be installed, inflated to form an annular seal, and then removed at some point in time during the cleaning operation to ensure that the combustion chamber 198 also is effectively foam cleaned in addition to the turbine components. In yet other embodiments, the inflatable device 300 can be installed into the outer plenum 208, inflated with inflating fluid to form a seal, and foam can be added downstream of the inflatable device 300 so that foam is forced through the turbine shroud 202. In this regard, foam can be driven forward rather than rearward to clean desired components. Example embodiments of the inflatable device 300 and methods of using the inflatable device 300 will be provided below.

Figure 3:
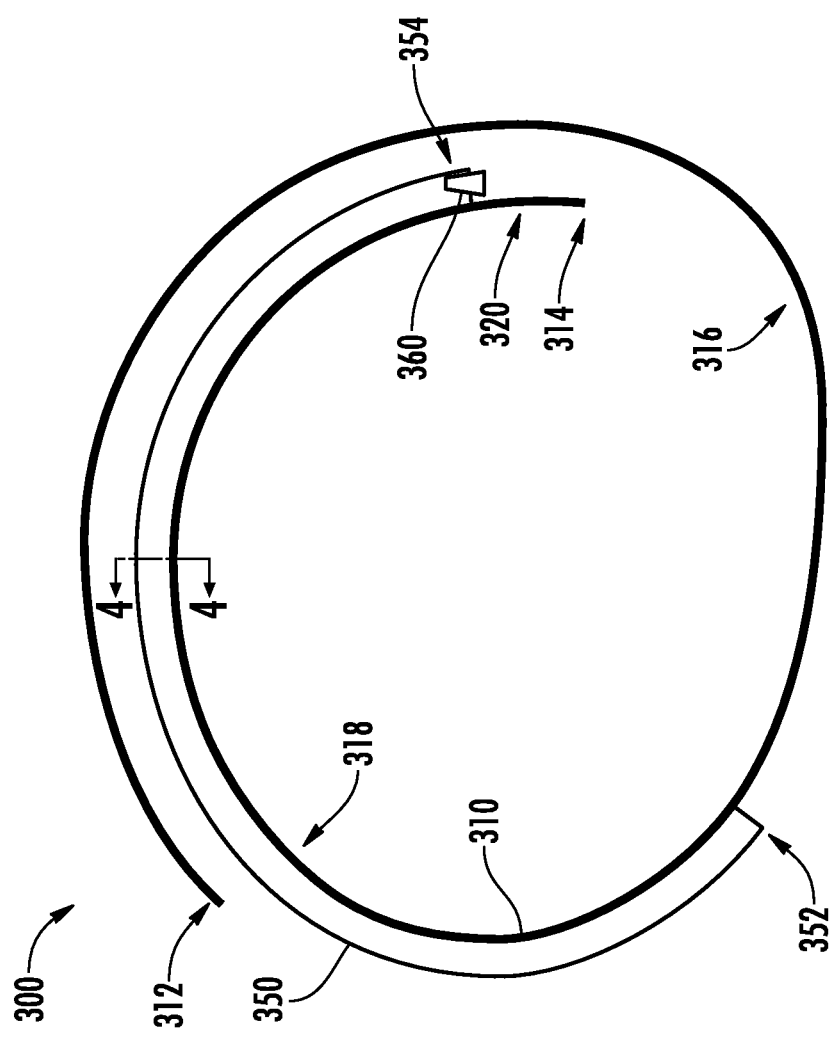
FIG. 3 provides a schematic view of an example inflatable device according to one example embodiment of the present subject matter.

FIG. 3 provides a schematic view of an example inflatable device 300 according to one example embodiment of the present subject matter. The inflatable device 300 includes a backbone 310 and an inflatable bladder 350 attached or connected to the backbone 310. Generally, the backbone 310 functions as a guiding mechanism for installing the inflatable device 300 within a gas turbine engine, such as the gas turbine engine 100 of FIG. 1. When the inflatable device 300 is positioned in place within a gas turbine engine, the inflatable bladder 350, shown deflated in FIG. 3, can be inflated with an inflatable fluid (e.g., compressed air) so that the inflatable bladder 350 forms a seal along a fluid path of the gas turbine engine. For example, as shown in FIG. 2, the inflatable device 300 can be installed within an annular combustion chamber of a combustor and the inflatable bladder 350 can then be inflated to form an annular seal therein that acts as an in situ temporary barrier within the gas turbine engine. Forming such a seal or barrier can be advantageous for a number of applications, such as during a foam engine cleaning.

The backbone 310 extends longitudinally or lengthwise between a first end 312 and a second end 314. For this embodiment, the backbone 310 is formed of a single continuous piece and has three sections, including a free section 316, a bladder support section 318, and a free extension section 320. The free section 316 extends longitudinally from the first end 312 to the bladder support section 318. The free section 316 is a "free end" of the backbone 310 that is not attached or connected to the inflatable bladder 350. As will be explained below, the free section 316 can be used to "fish" or guide the inflatable device 300 annularly through an annular chamber. In some embodiments, the free section 316 has a longitudinal or lengthwise length that is equal to or greater than a longitudinal or lengthwise length the bladder support section 318 of the backbone 310.

The bladder support section 318 extends longitudinally between the free section 316 and the free extension section 320. The inflatable bladder 350 is connected or attached to the bladder support section 318 of the backbone 310. Particularly, the inflatable bladder 350 is connected or attached to a first surface 322 (FIG. 4) of the backbone 310. The inflatable bladder 350 can be connected or attached longitudinally to the backbone 310, or more particularly, the bladder support section 318 of the backbone 310 as shown in FIG. 3. In some embodiments, the entire longitudinal length of the inflatable bladder 350 is connected or attached to the backbone 310.

The free extension section 320 of the backbone 310 extends longitudinally between the bladder support section 318 and the second end 314. The free extension section 320 is also a "free end" that is not attached or connected to the inflatable bladder 350. As will be explained below, the free extension section 320 can be used by an operator or machine to push or move the inflatable device 300 through an access port and into position within a chamber of a gas turbine engine. Specifically, an operator or machine can grip the free extension section 320 and can push the inflatable device 300 into place.

In some embodiments, the backbone 310 is formed of a flexible and inextensible material. For instance, in some embodiments, the backbone 310 is formed of a material having a flexural modulus in the range of 100-1000 ksi. Further, additionally or alternatively, in some embodiments, the backbone is formed of a material having a tensile strength of greater than 46 MPa (6,672 psi). Accordingly, in some embodiments, the backbone 310 is formed of an Acrylonitrile Butadiene Styrene (ABS) material. In other embodiments, the backbone 310 is formed of a Nylon material. Further, in some embodiments, the backbone 310 can be preformed. For instance, in some embodiments, the backbone 310 can be preformed to have a circular or substantially circular shape. Preforming the backbone 310 with a circular shape may advantageously facilitate moving the inflatable device 300 through an annular chamber, for example. In some embodiments, the free section 316 and the bladder support section 318 of the backbone 310 are formed of the same material. In some embodiments, the free section 316, the bladder support section 318, and the free extension section 320 are all formed of the same material. In yet other embodiments, the free section 316 and the bladder support section 318 of the backbone 310 are formed of different materials. As one example, the free section 316 can be formed of a lead wire, a chain, a string, etc. while the bladder support section 318 can be formed of an ABS material.

Figure 4:
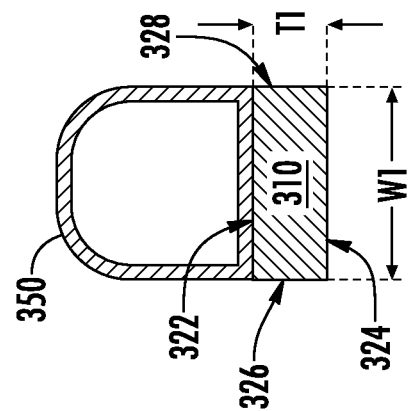
FIG. 4 provides a schematic cross-sectional view of the inflatable device taken along line 4-4 of FIG. 3.

FIG. 4 provides a schematic cross-sectional view of the inflatable device 300 taken along line 4-4 of FIG. 3. As depicted, the backbone 310 has a non-circular cross section. Particularly, for this embodiment, the backbone 310 has a rectangular cross section. The backbone 310 has a first surface 322 and a second surface 324 positioned opposite the first surface 322. The inflatable bladder 350 is connected or attached to the first surface 322 as noted above. The backbone 310 also has sidewalls, including a first sidewall 326 and a second sidewall 328 positioned opposite the first sidewall 326. Notably, the non-circular cross section of the backbone 310, or in this example the rectangular cross section of the backbone 310, has increased stiffness that is designed to prevent or reduce twisting of the backbone 310 as it is moved through an annular chamber and the rectangular section has reduced stiffness for bending to allow it to conform to the combustor annular flowpath. The flat second surface 324 and flat first and second sidewalls 326, 328 can engage a surface defining the annular chamber (e.g., the inner liner 186 defining the combustion chamber 198; see FIG. 2) and can prevent the backbone 310 from twisting.

For the depicted embodiment of FIG. 4, a lateral width W1 of the backbone 310 is greater than a thickness T1 of the backbone 310. In this manner, the second surface 324 is more likely to be the surface of the backbone 310 that engages and remains engaged with the surface (e.g., the inner liner 186 defining the combustion chamber 198; see FIG. 2) defining the annular chamber. This can further prevent or reduce twisting of the backbone 310 when it is moved circumferentially through the annular chamber. In some embodiments, the lateral width W1 of the backbone 310 is less than twenty-five millimeters (25 mm; 1 inch).

In some embodiments, the backbone 310 has at least one flat surface, wherein the flat surface is not the surface of the backbone 310 to which the inflatable bladder 350 is connected or attached. For instance, the second surface 324 can be the flat surface. The flat second surface 324 can facilitate movement of the backbone 310 and consequently the inflatable device 300 through the chamber. The first surface 322 and the first and second sidewalls 326, 328 can likewise have flat surfaces or can have curved surfaces in such embodiments.

Further, as shown in FIG. 3, the inflatable bladder 350 extends longitudinally or lengthwise between a first end 352 and a second end 354. As noted, the inflatable bladder 350 is connected or attached to the backbone 310. For this embodiment, the inflatable bladder 350 is connected longitudinally to the first surface 322 (FIG. 4) of the bladder support section 318 of the backbone 310. In some embodiments, the inflatable bladder 350 is connected or attached to the backbone 310 along at least a quarter of the total longitudinal length of the backbone 310. In other embodiments, the inflatable bladder 350 is connected or attached to the backbone 310 along at least half of the total longitudinal length of the backbone 310. In yet other embodiments, the inflatable bladder 350 is connected or attached to the backbone 310 along at least three quarters of the total longitudinal length of the backbone 310.

Figure 9:
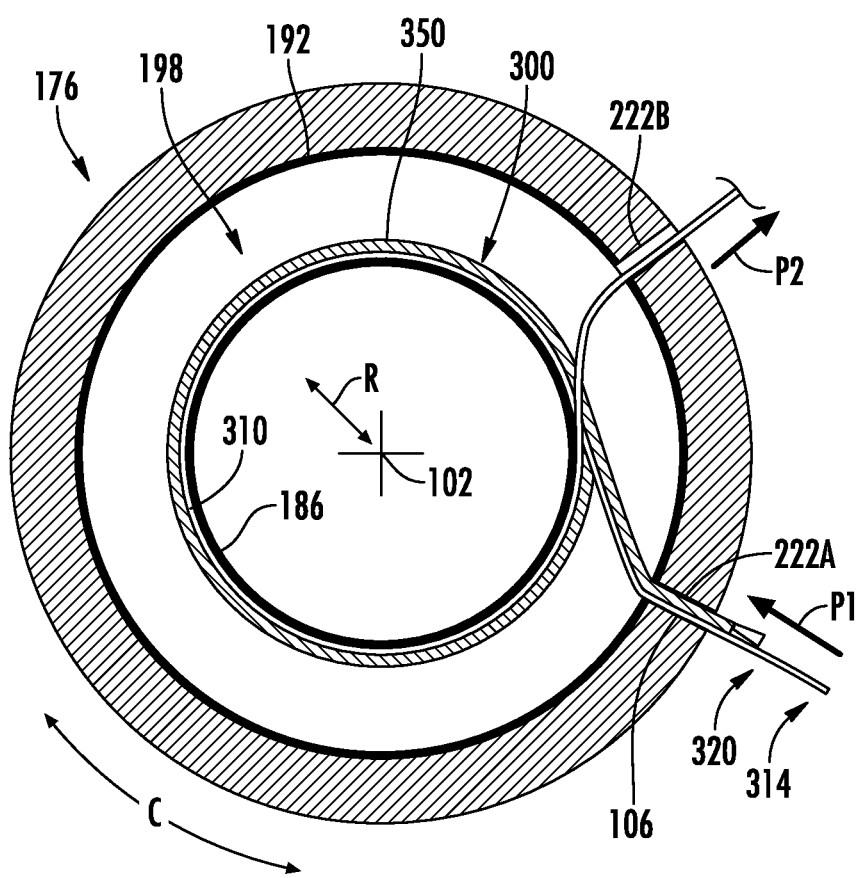
Figure 10:
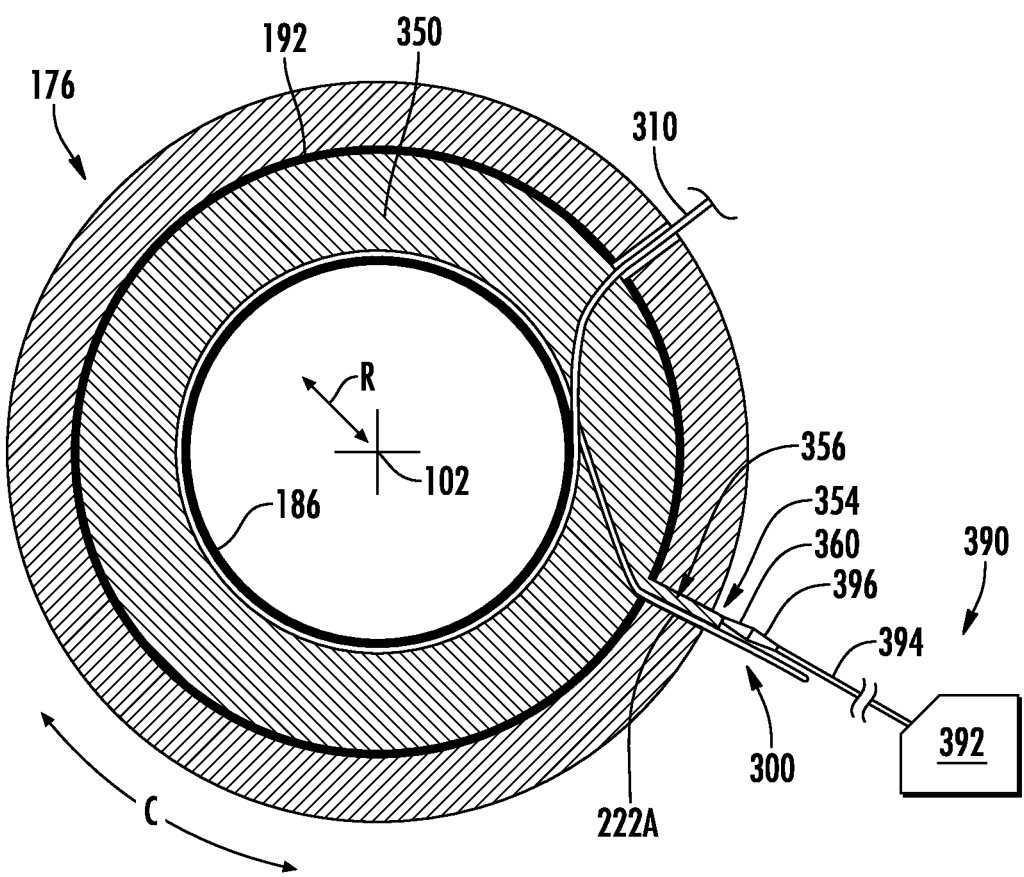

The inflatable bladder 350 is inflatable with an inflating fluid, such as compressed air or a liquid. As shown best in FIG. 10, an inflating fluid can be supplied to the inflatable bladder 350 by a fluid supply system 390. The fluid supply system 390 includes a fluid supply 392 that contains the inflating fluid. The fluid supply system 390 also includes one or more fluid supply lines 394 that fluidly connect the fluid supply 392 with the inflatable bladder 350. In this regard, the inflatable bladder 350 can be fluidly coupled or connected with a fluid supply 392. A fitting 360 coupled with or connected to the inflatable bladder 350 at its second end 354 can be connected to a complementary connector 396 of one of the fluid supply lines 394. The fitting 360 provides an ingress and egress for the inflating fluid to enter or exit the inflatable bladder 350. In FIGS. 3 and 9, the inflatable bladder 350 is shown deflated or in a deflated state. During installation of the inflatable device 300 into an annular chamber, the inflatable bladder 350 is typically deflated. In this way, the inflatable device 300 can be inserted through an access port (e.g., an igniter port) having a diameter equal to or less than twenty millimeters (20 mm; 0.8 inches). Then, when the inflatable bladder 350 of the inflatable device 300 is positioned in place (e.g., positioned annularly within a combustion chamber), the inflatable bladder 350 can be inflated with inflating fluid supplied by the fluid supply system 390 to ultimately form an annular seal, e.g., as shown in FIG. 10.

In some embodiments, the inflatable bladder 350 is formed of a fluid impermeable material (e.g., a liquid impermeable material and/or a gas impermeable material). In this way, when an inflating fluid is introduced into the inflatable bladder 350, the inflating fluid is held therein. In some embodiments, the longitudinal inflatable bladder 350 is formed of an expandable material capable of strain greater than fifty percent (50%) when the inflatable bladder 350 is inflated. Further, in some embodiments, the inflatable bladder 350 is formed of a material that can expand radially (e.g., radially outward) to its inflated state at least three times its initial diameter or shape in its deflated state. In other embodiments, the inflatable bladder 350 is formed of a material that can expand radially (e.g., radially outward) to its inflated state at least five times its initial diameter or shape in its deflated state. In yet other embodiments, the inflatable bladder 350 is formed of a foldable material that permits the inflatable bladder 350 to be folded up so that the inflatable bladder 350 and backbone 310 of the inflatable device 300 may pass through an access port, such as an igniter port of an aviation gas turbine engine.

Figure 5:
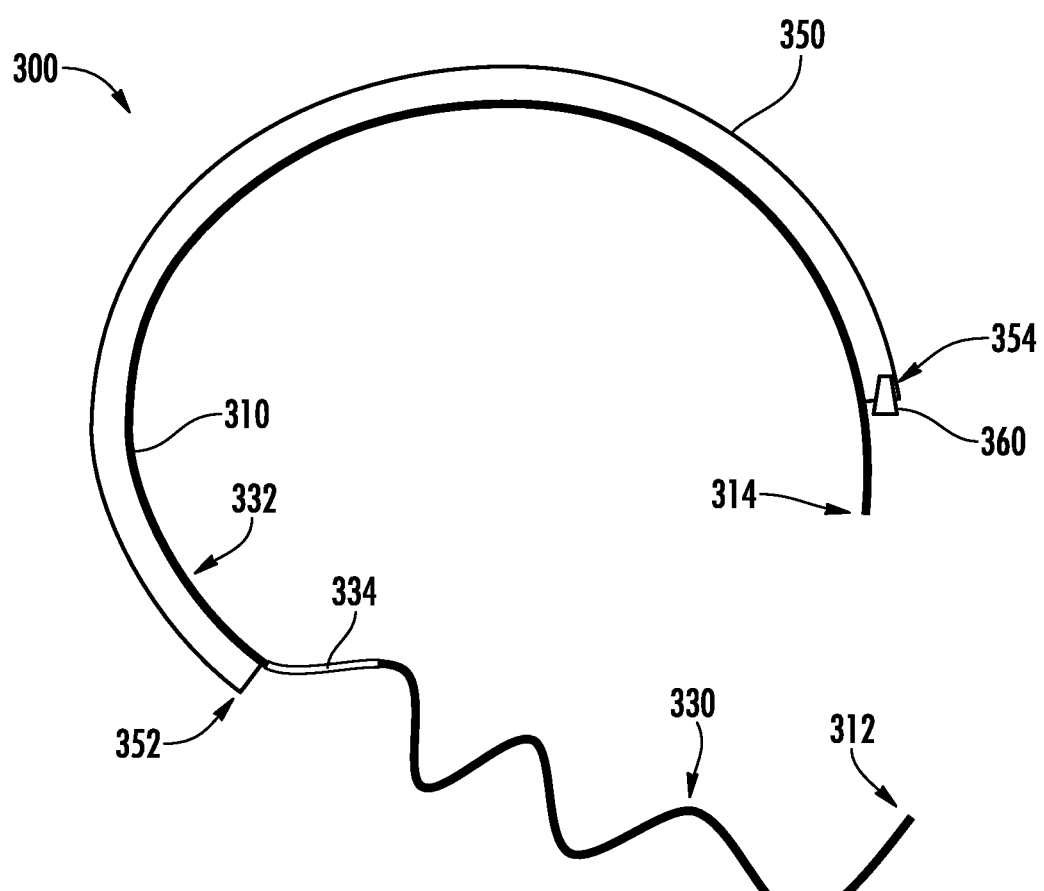
FIG. 5 provides a schematic view of another example inflatable device according to an example embodiment of the present subject matter.
Figure 6:
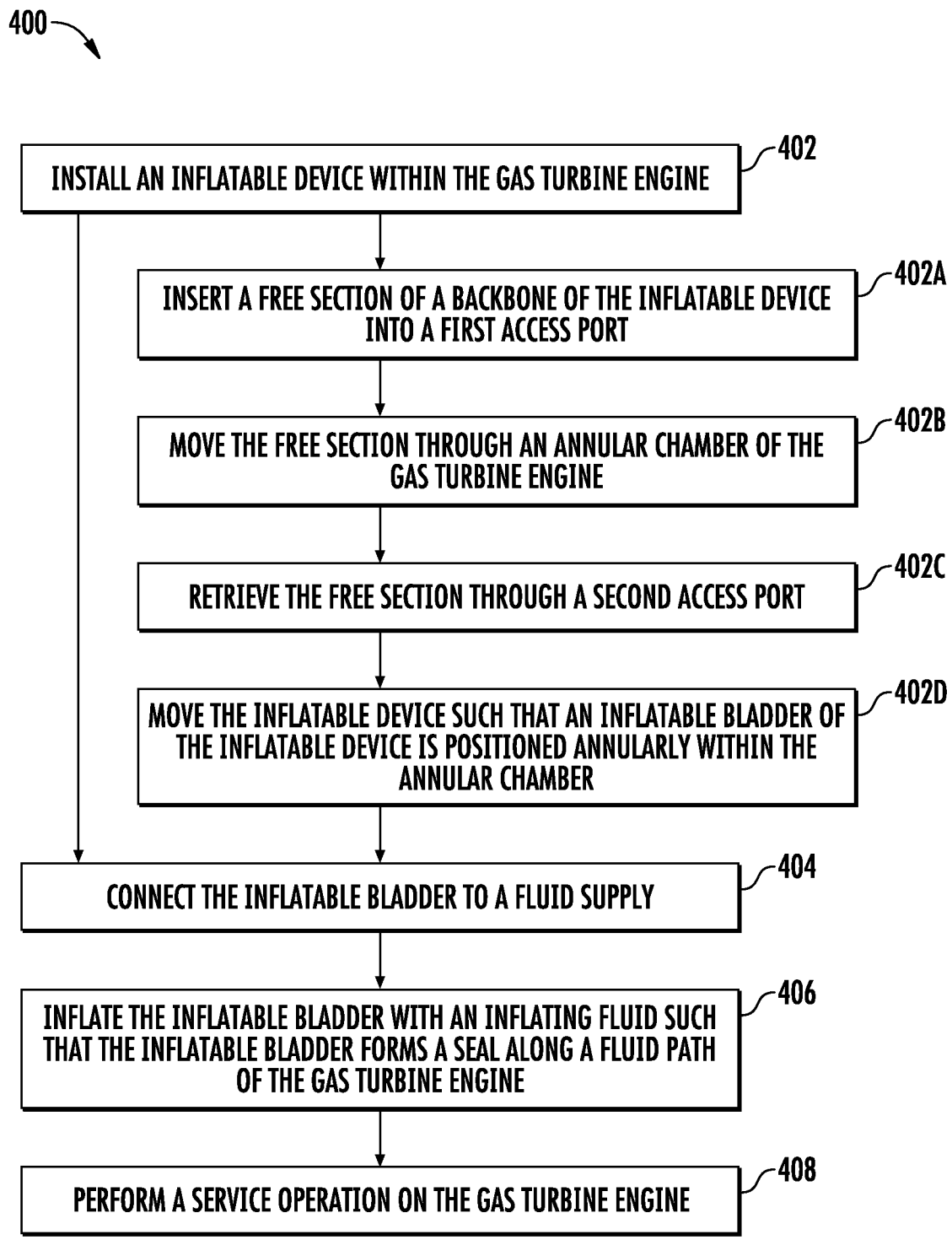
FIG. 6 provides a flow diagram for a method of using an inflatable device to form an in situ temporary barrier within a gas turbine engine according to an example embodiment of the present subject matter.

FIG. 5 provides a schematic view of another example inflatable device 300 according to an example embodiment of the present subject matter. The inflatable device of FIG. 5 is configured in the same manner as the inflatable device of FIGS. 3 and 4 except as noted below. For the depicted embodiment of FIG. 5, the backbone 310 is formed in segments rather than being formed of a single continuous piece as is the backbone of the inflatable device of the embodiment of FIG. 3. Particularly, the backbone 310 of the inflatable device 300 of FIG. 5 includes a first segment 330 and a second segment 332. The first segment 332 and the second segment 334 can each have non-circular cross sections, such as rectangular cross sections. The first segment 330 and the second segment 332 are coupled together by a connection member 334, which in this embodiment is a string. In other embodiments, the connection member 334 can be other suitable members, such as a chain, one or more links, a rope, etc.

The first segment 330 is a "free end" of the backbone 310 that is not attached or connected to the inflatable bladder 350. The first segment 330 can be used to "fish" or guide the inflatable device 300 annularly through an annular chamber. In some embodiments, the first segment 330 has a longitudinal or lengthwise length that is equal to or greater than a longitudinal or lengthwise length of the second segment 332 of the backbone 310. The second segment 332 of the backbone 310 extends longitudinally between the connection member 334 and the second end 314. The inflatable bladder 350 is connected or attached longitudinally to a portion of the second segment 332. The inflatable bladder 350 can be connected or attached to the portion of the second segment 332 in any suitable manner described herein. The second segment 332 also includes a portion to which the inflatable bladder 350 is not connected or attached. This portion, or extension portion of the second segment 332, is also a "free end" that can be used by an operator or machine to push or move the inflatable device 300 through an access port and into position within a chamber of a gas turbine engine. Specifically, an operator or machine can grip the free portion of the second segment 332 and can push the inflatable device 300 into place.

For this embodiment, the connection member 334 is connected to the second segment 332 of the backbone 310 at or proximate (within 30 cm; 1 inch) a longitudinal position where the first end 352 of the inflatable bladder 350 connects to the second segment 332. The connection member 334 extends longitudinally and connects to the first segment 330. In some embodiments, the connection member 334 has a longitudinal length that is or is less than one quarter of the longitudinal length of the first segment 330 of the backbone 310. Advantageously, the connection member 334 extending longitudinally between the first and second segments 330, 332 of the backbone 310 can facilitate moving the inflatable device 300 into position.

With reference now to FIGS. 6 through 10, FIG. 6 provides a flow diagram for a method (400) of using an inflatable device to form an in situ temporary barrier within a gas turbine engine according to an example embodiment of the present subject matter. For instance, the inflatable device of FIG. 3 or the inflatable device of FIG. 5 can be inflated to form an in situ temporary barrier within a gas turbine engine using method (400). FIGS. 7, 8, 9, and 10 will be referenced to provide context to method (400). FIGS. 7 through 10 depict various stages of the inflatable device being installed within a gas turbine engine and inflated therein to form an in situ temporary barrier.

At (402), the method (400) includes installing an inflatable device within a gas turbine engine. For instance, the inflatable device can be the inflatable device of FIG. 3 or FIG. 5, for example. The gas turbine engine can be any suitable type of gas turbine engine, such as a turbofan, turboprop, turboshaft, etc. The inflatable device can be installed within a gas turbine engine while the engine is online or on wing of an aircraft, for example. The inflatable device can also be installed within a gas turbine engine that is offline or off wing.

Notably, the inflatable device has an inflatable bladder attached to a backbone. The inflatable bladder can be formed of an expandable material so that when the inflatable bladder is inflated with an inflating fluid the inflatable bladder fills a cavity or chamber to form a seal along a fluid path of the gas turbine engine. The seal formed by inflation of the inflatable bladder can be an annular seal, for example. The backbone can be formed of a flexible and inextensible material and acts as the guiding mechanism for guiding the inflatable bladder into place within the gas turbine engine. In some implementations, the backbone is formed of a material having a flexural modulus in the range of 100-1000 ksi. Further, additionally or alternatively, in some implementations, the backbone is formed of a material having a tensile strength of greater than 46 MPa (6,672 psi). Accordingly, in some implementations, the backbone is formed of an Acrylonitrile Butadiene Styrene (ABS) material. In other embodiments, the backbone is formed of a Nylon material. Further, in some implementations, the backbone can be preformed, e.g., with a circular or substantially circular shape. Preforming the backbone with a circular shape may advantageously facilitate moving the inflatable device through an annular chamber, for example. An example manner in which the inflatable device can be installed within a gas turbine engine will be described below with reference to (402A) through (402D).

At (402A), installing the inflatable device within a gas turbine engine at (402) can include inserting a free section of the backbone through a first access port of the gas turbine engine. The free section of the backbone is a section or portion of the backbone along which the inflatable bladder is not attached. In this regard, the free section is "free." The free section 316 of the backbone 318 can be inserted through a first access port 222A, which is shown schematically in FIG. 7. Particularly, to insert the free section 316 of the backbone 310 through the first access port 222A, an operator or machine can insert the first end 312 of the backbone 310 and push the free section 316 inward along the radial direction R toward the longitudinal centerline 102 (the longitudinal centerline 102 extends into and out of the page in FIG. 7). In this manner, the free section 316 of the backbone 310 enters the combustion chamber 198 through the first access port 222A. In this example, the first access port 222A is an igniter port that provides internal access to the combustion chamber 198 of the combustor 176.

In some implementations, the free section 316 of the backbone 310 is oriented in a preselected orientation prior to or during insertion of the first end 312 of the backbone 310 into the first access port 222A. In this way, when the first end 312 of the backbone 310 enters the combustion chamber 198 and engages the inner liner 186, the second surface 324 (FIG. 4) of the backbone 310 engages and remains engaged with the inner liner 186 as the free section 316 of the backbone 310 is moved along the circumferential direction C as will be explained below. This facilitates moving the free section 316 through the annular combustion chamber 198 and prevents twisting of the backbone 310.

At (402B), installing the inflatable device within a gas turbine engine at (402) can further include moving the free section of the backbone along a circumferential direction through the annular chamber. For instance, with reference to FIG. 7, the free section 316 of the backbone 310 is shown being moved, represented by the arrow M, along the circumferential direction C through the annular combustion chamber 198. In this example, the free section 316 of the backbone 310 is shown being moved in a counterclockwise direction from the perspective in FIG. 7. It will be appreciated that the free section 316 of the backbone 310 can be moved in a clockwise direction in other implementations. To move the free section 316 through the annular combustion chamber 198 along the circumferential direction C, an operator or machine can push the free section 316 further inward through the first access port 222A along the radial direction R. The pushing of the free section 316 causes the free section 316 to move circumferentially through the combustion chamber 198. Eventually, the first end 312 of the backbone 310 traverses through an entirety of the annulus of the annular combustion chamber 198 as depicted in FIG. 8. Particularly, as shown in FIG. 8, the free section 316 of the backbone 310 is moved such that the first end 312 traverses more than three hundred sixty degrees (360°) through the annular combustion chamber 198. The flexible and inextensible material of the backbone 310 allows the backbone 310 to be moved through the annular combustion chamber 198 efficiently and effectively with repeatable reliability.

At (402C), installing the inflatable device within a gas turbine engine at (402) can further include retrieving the free section of the backbone through a second access port of the gas turbine engine. For instance, with reference to FIG. 8, the free section 316 of the backbone 310 can be fished or moved through the annular combustion chamber 198 at (402B) so that the first end 312 is located proximate a second access port 222B (shown schematically in FIG. 8) that is spaced from the first access port 222A along the circumferential direction C. In this manner, the first end 312 of the backbone 310 can be retrieved and pulled outward through the second access port 222B along the radial direction R. In this example, the second access port 222B is an igniter port that provides internal access to the combustion chamber 198 of the combustor 176.

The free section 316 of the backbone 310 at or proximate the first end 312 can be retrieved through the second access port 222B by a tool 380, such a spring-loaded claw as depicted in FIG. 8. The tool 380 can be inserted inward through the second access port 222B along the radial direction R. The claws or grasping mechanism of the tool 380 can grasp the free section 316 of the backbone 310 as shown in FIG. 8. The tool 380 along with the retained free section 316 of the backbone 310 can then be pulled out of the combustion chamber 198 through the second access port 222B. In this regard, at this stage in the installation process, the first end 312 of the backbone 310 is positioned external to the combustion chamber 198 and the second access port 222B and the second end 314 (FIG. 9) is positioned external to the combustion chamber 198 and the first access port 222A. Notably, when the free section 316 of the backbone 310 is retrieved through the second access port 222B, the backbone 310 extends substantially annularly through the combustion chamber 198 and at least a portion of the backbone 310 engages or wraps around the inner liner 186 as shown in FIG. 8. As used herein, "substantially annularly" means that the stated object, such as the backbone 310, traverses or extends at least two hundred seventy degrees (270°) through or around an annular chamber.

At (402D), installing the inflatable device within a gas turbine engine can further include moving the inflatable device so that the inflatable bladder extends annularly or substantially annularly within the annular chamber. For instance, as shown in FIG. 9, the inflatable device 300 is moved so that the inflatable bladder 350 extends annularly or substantially annularly within the annular combustion chamber 198. The second surface 324 (FIG. 4) of the backbone 310 engages the inner liner 186, and as the inflatable bladder 350 is attached or connected to the first surface 322 (FIG. 4) of the backbone 310, the inflatable bladder 350 is positioned outward of the backbone 310 along the radial direction R. Advantageously, this allows the inflatable bladder 350 to expand unimpeded outward along the radial direction R when inflated.

In some implementations, the inflatable bladder 350 can be moved into position within the combustion chamber 198 by pushing the inflatable device 300 through the first access port 222A and pulling the inflatable device 300 out of the second access port 222B. More particularly, an operator or machine can grasp the free extension section 320 of the backbone 310 and can push the inflatable device 300 further into the first access port 222A, which ultimately moves the backbone 310 and inflatable bladder 350 connected thereto along the circumferential direction C through the annular combustion chamber 198. The pushing action is represented in FIG. 9 by the arrow P1. The operator or machine can also grasp the retrieved free section 316 of the backbone 310 extending externally to the gas turbine engine and can pull the inflatable device 300 further out of the second access port 222B, which ultimately moves the backbone 310 and inflatable bladder 350 connected thereto along the circumferential direction C through the annular combustion chamber 198. The pulling action is represented in FIG. 9 by the arrow P2. Notably, the free section 316 and the free extension section 320 of the backbone 310 are sections or portions of the backbone 310 that are "free," and thus the inflatable bladder 350 need not be grasped or touched to be moved into position. This may protect the inflatable bladder 350 from being inadvertently punctured or otherwise damaged during installation. The pushing and pulling technique can be used to efficiently move the inflatable bladder 350 into position within the annular combustion chamber 198. However, it will be appreciated that inflatable device 300 can be moved into position within the annular combustion chamber 198 with only the pushing action or only the pulling action in other embodiments.

At (404), the method (400) includes connecting the inflatable bladder to a fluid supply. For instance, as depicted in FIG. 10, the fitting 360 coupled with or connected to the inflatable bladder 350 at its second end 354 can be connected to the connector 396 of one of the fluid supply lines 394, which is in turn connected to the fluid supply 392 of the fluid supply system 390. In this manner, the inflatable bladder 350 is fluidly connected with the fluid supply 392. Accordingly, when desired, inflating fluid can be delivered from the fluid supply 392 to the inflatable bladder 350.

At (406), with the inflatable device installed and the inflatable bladder connected to the fluid supply, the method (400) includes inflating the inflatable bladder with an inflating fluid such that the inflatable bladder forms a seal along a fluid path of the gas turbine engine. For instance, as shown in FIG. 10, the inflatable bladder 350 is shown inflated with an inflating fluid. The inflatable bladder 350 is inflatable with an inflating fluid, such as compressed air or a liquid. The inflating fluid can be delivered to the inflatable bladder 350 passively or actively. As one example, a valve (not shown) can be opened and the inflating fluid can passively fill into the inflatable bladder 350. As another example, a pump (not shown) can be driven to actively move the inflating fluid into the inflatable bladder 350.

When inflated, as depicted, the inflatable bladder 350 forms an annular seal within the combustion chamber 198. In this manner, the inflatable bladder 350 can prevent fluid from flowing thereby. Particularly, the annular seal formed by the inflated inflatable bladder 350 forms an in situ temporary barrier along the fluid path of the gas turbine engine, which in this example is the core air flowpath 132 (FIG. 2) as the inflatable bladder 350 is inflated within the combustion chamber 198.

To inflate the inflatable bladder 350, an inflating fluid (e.g., compressed air stored in fluid supply) can be delivered into the inflatable bladder 350. The inflating fluid can flow into the inflatable bladder 350 and can cause the inflatable bladder 350 to expand outward along the radial direction R so the inflatable bladder 350 engages the outer liner 192. The inflatable bladder 350 can also expand along the axial direction A. For instance, as shown in FIG. 2, the inflatable bladder 350 can expand along the axial direction A so that the inflatable bladder 350 expands the entire axial length of the combustion chamber 198, e.g., from the forward radial wall 200 to the leading edge of the nozzle 164 of the first stage 212.

In some implementations, the fitting 360 can be directly fluidly connected with the inflatable bladder 350, e.g., as shown in FIG. 10. Accordingly, the inflating fluid can flow through the fitting 360 and into the inflatable bladder 350. In inflating the inflatable bladder 350, the fitting 360 is positioned external to the combustion chamber 198 and the first access port 222A. The inflatable bladder 350 can include a supply portion 356 that extends longitudinally a distance spanning from the second end 354 of the inflatable bladder 350 to an end point. The distance can be selected to be approximately the radial distance of an access port, such as the first access port 222A. Notably, the supply portion 356 can be made of a thicker material than the non-supply portion of the inflatable bladder 250. In this way, inflating fluid can less easily expand this portion of the inflatable bladder 350 relative to the non-supply portion.

In other example implementations, the fitting 360 can be fluidly coupled with the inflatable bladder 350 via a supply tube that extends longitudinally between the fitting 360 and an inlet of the inflatable bladder 350. The supply tube can be formed of a non-expandable material. The supply tube can be sized to be received within an access port (e.g., the first access port 222A) and can extend longitudinally at least the radial length of the access port so that the supply tube can extend between the fitting 360 positioned external to the gas turbine engine and an inlet of the inflatable bladder 350 positioned within the combustion chamber 198. In such embodiments, the inflatable device 300 is moved so that the inflatable bladder 350 extends annularly or substantially annularly within the chamber and the first end 352 (FIG. 3) and the second end 354 of the inflatable bladder 350 are located within the annular combustion chamber 198.

At (408), in some implementations, the method (400) includes performing a service operation with the inflatable bladder inflated thereby forming a seal along a fluid path of the gas turbine engine. For instance, the service operation can be at least one of a foam cleaning operation, a water wash cleaning operation, an engine cleaning operation generally, and a coating operation for the airfoils positioned along the core air flowpath. Other service operations are contemplated.

For instance, for a foam cleaning operation, a foam solution or foam can be introduced into a gas turbine engine as described previously. The foam can exit the compressor section and can flow into the combustion section. With the inflatable bladder 350 forming an annular seal as shown in FIGS. 2 and 10, the foam is prevented from flowing into the combustion chamber 198. Thus, the foam is directed into inner and outer plenums located inward and outward of the combustion chamber 198, respectively. The foam can bypass the combustor and traverse axially to the turbine section. Advantageously, the foam can flow into the inner cavities of components of the turbine section, such as stator vanes, turbine blades, shrouds, etc. As a result, the inner cavities of these components can be effectively cleaned with the foam. By preventing the flow of foam into the combustion chamber 198, foam is prevented from accumulating in the combustion chamber 198; thus, a greater volume of foam can be directed to the turbine section to clean components thereof.

After or during performing the service operation at (408), the method (400) can also include deflating the inflatable bladder 350 and removing the inflatable device 300 from the gas turbine engine. To deflate the inflatable bladder 350, the inflating fluid is let out through the fitting 360. The inflatable device 300 can then be pulled outward from the first access port 222A. In addition, optionally, the inflatable device 300 can be pushed inward through the second access port 222B.

In this way, the inflatable device 300 can be removed from the combustion chamber 198 of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. A method of forming an in situ temporary barrier within a gas turbine engine, the method comprising: installing an inflatable device within the gas turbine engine, the inflatable device having a backbone and an inflatable bladder connected to the backbone; and inflating the inflatable bladder with an inflating fluid such that the inflatable bladder forms a seal along a fluid path of the gas turbine engine.

2. The method of any preceding clause, wherein the backbone is formed of a material that is inextensible under tension and allows for conformal bending of the backbone.

3. The method of any preceding clause, wherein the inflatable bladder is inflated within an annular chamber that forms at least a portion of the fluid path, and wherein the seal formed by inflation of the inflatable bladder is an annular seal.

4. The method of any preceding clause, wherein installing the inflatable device within the gas turbine engine comprises: inserting a free section of the backbone through a first access port of the gas turbine engine that provides access to the annular chamber, the free section of the backbone being a section of the backbone along which the inflatable bladder is not connected; and moving the free section of the backbone around the annular chamber along a circumferential direction defined by the gas turbine engine.

5. The method of any preceding clause, wherein the free section of the backbone is moved around the annular chamber along the circumferential direction more than three hundred sixty degrees.

6. The method of any preceding clause, wherein installing the inflatable device within the gas turbine engine further comprises: retrieving the free section of the backbone through a second access port of the gas turbine engine that provides access to the annular chamber; and moving the inflatable device further along the circumferential direction such that the inflatable bladder extends annularly or substantially annularly within the annular chamber.

7. The method of any preceding clause, wherein moving the inflatable device further along the circumferential direction such that the inflatable bladder extends annularly or substantially annularly within the annular chamber comprises: pushing a portion of the inflatable device that extends externally from the annular chamber and from the first access port such that the inflatable device moves further into the first access port; and pulling a portion of the free section that extends externally from the annular chamber and the second access port further out of the second access port.

8. The method of any preceding clause, wherein the backbone has a bladder support section and a free extension section, the bladder support section being a section of the backbone to which the inflatable bladder is connected, the free extension section being a section of the backbone along which the inflatable bladder is not connected, the bladder support section being positioned between the free section and the free extension section, and wherein the portion of the inflatable device that extends externally from the annular chamber and from the first access port that is pushed is the free extension section.

9. The method of any preceding clause, wherein after inflating the inflatable bladder with the inflating fluid such that the inflatable bladder forms the seal along the fluid path of the gas turbine engine, the method further comprises: performing a foam wash of the gas turbine engine.

10. The method of any preceding clause, wherein the backbone includes a first segment and a second segment coupled together by a connection member, wherein the inflatable bladder is connected to the second segment but not the first segment.

11. An inflatable device for forming an in situ temporary barrier within a gas turbine engine, the inflatable device comprising: a backbone; and an inflatable bladder connected longitudinally to the backbone and operable to receive an inflating fluid, the inflatable bladder being formed of an expandable or foldable material.

12. The inflatable device of any preceding clause, wherein the backbone has a free section, a bladder support section, and a free extension section, the bladder support section being a section of the backbone to which the inflatable bladder is connected, the free section and the free extension section being sections of the backbone along which the inflatable bladder is not connected, the bladder support section being positioned between the free section and the free extension section.

13. The inflatable device of any preceding clause, wherein the inflatable bladder has longitudinal length, and wherein the free section of the backbone extends longitudinally at least the longitudinal length of the inflatable bladder.

14. The inflatable device of any preceding clause, wherein the backbone has at least one flat surface, wherein the inflatable bladder is not connected to the at least one flat surface.

15. The inflatable device of any preceding clause, wherein the at least one flat surface is a second surface positioned opposite a first surface of the backbone, wherein the inflatable bladder is connected to the first surface of the backbone.

16. The inflatable device of any preceding clause, wherein the backbone is formed a single continuous piece.

17. The inflatable device of any preceding clause, wherein the backbone includes a first segment and a second segment coupled together by a connection member.

18. The inflatable device of any preceding clause, wherein the backbone is formed of a material having a flexural modulus in the range of 100-1000 ksi.

19. The inflatable device of any preceding clause, wherein the backbone is formed of a material having a tensile strength of greater than 46 MPa.

20. A method of forming an in situ temporary barrier within a gas turbine engine, the method comprising: installing an inflatable device within an annular chamber defined by the gas turbine engine, the inflatable device having a backbone and an inflatable bladder connected to the backbone, the inflatable bladder being formed of an expandable or foldable material, wherein installing the inflatable device within the annular chamber comprises: guiding a free section of the backbone through a first access port of the gas turbine engine and circumferentially through the annular chamber, the free section of the backbone being a section of the backbone along which the inflatable bladder is not connected; retrieving a portion of the free section of the backbone through a second access port of the gas turbine engine so that the portion of the free section is positioned external to the annular chamber; and moving the inflatable device by performing at least one of pulling on the portion of the free section extending from the second access port external to the annular chamber and pushing on a portion of the inflatable device extending from the first access port external to the annular chamber so that the inflatable bladder extends annularly or substantially annularly within the annular chamber; and inflating the inflatable bladder with an inflating fluid such that the inflatable bladder forms an annular seal within the annular chamber.

What is claimed is:

1. A method of forming an in situ temporary barrier within a gas turbine engine, the method comprising:
    installing an inflatable device within the gas turbine engine, the inflatable device having a backbone and an inflatable bladder, the inflatable bladder having an elongated connection with the backbone that extends between a first end point on the backbone and a second end point on the backbone, wherein the second end point is spaced along a length of the backbone from the first end point; and
    inflating the inflatable bladder with an inflating fluid such that the inflatable bladder forms a seal along a fluid path of the gas turbine engine.

2. The method of claim 1, wherein the backbone comprises a flexible and inextensible material.

3. The method of claim 1, wherein the inflatable bladder is inflated within an annular chamber that forms at least a portion of the fluid path, and wherein the seal formed by inflation of the inflatable bladder is an annular seal.

4. The method of claim 1, wherein after inflating the inflatable bladder with the inflating fluid such that the inflatable bladder forms the seal along the fluid path of the gas turbine engine, the method further comprises:
    performing a foam wash of the gas turbine engine.

5. The method of claim 1, wherein the backbone includes a first segment and a second segment coupled together by a connection member, wherein the inflatable bladder is connected to the second segment but not the first segment.

6. The method of claim 1, wherein the backbone is formed of a material having a flexural modulus in the range of about 100-1000 ksi.

7. The method of claim 1, wherein the backbone is formed of a material having a tensile strength of greater than about 46 MPa.

8. The method of claim 1, wherein the backbone is formed a single continuous piece.

9. The method of claim 1, wherein the inflatable bladder has a longitudinal length, and a free section of the backbone, wherein the backbone extends beyond the longitudinal length of the inflatable bladder.

10. The method of claim 1, wherein the backbone has at least one flat surface, and the inflatable bladder is not connected to the at least one flat surface.

11. The method of claim 3, wherein installing the inflatable device within the gas turbine engine comprises:
    inserting a free section of the backbone through a first access port of the gas turbine engine that provides access to the annular chamber, the free section of the backbone being a section of the backbone along which the inflatable bladder is not connected; and
    moving the free section of the backbone around the annular chamber along a circumferential direction defined by the gas turbine engine.

12. The method of claim 11, wherein the free section of the backbone is moved around the annular chamber along the circumferential direction more than three hundred sixty degrees.

13. The method of claim 11, wherein installing the inflatable device within the gas turbine engine further comprises:
retrieving the free section of the backbone through a second access port of the gas turbine engine that provides access to the annular chamber; and
moving the inflatable device further along the circumferential direction such that the inflatable bladder extends annularly or traverses or extends at least two hundred seventy degrees) (270°) through or around the annular chamber.

14. The method of claim 13, wherein moving the inflatable device further along the circumferential direction such that the inflatable bladder extends annularly or traverses or extends at least two hundred seventy degrees(270°) through or around the annular chamber comprises:
pushing a portion of the inflatable device that extends externally from the annular chamber and from the first access port such that the inflatable device moves further into the first access port; and
pulling a portion of the free section that extends externally from the annular chamber and the second access port further out of the second access port.

15. The method of claim 14, wherein the backbone has a bladder support section and a free extension section, the bladder support section being a section of the backbone to which the inflatable bladder is connected, the free extension section being a section of the backbone along which the inflatable bladder is not connected, the bladder support section being positioned between the free section and the free extension section, and wherein the portion of the inflatable device that extends externally from the annular chamber and from the first access port that is pushed is the free extension section.

16. A method of forming an in situ temporary barrier within a gas turbine engine, the method comprising:
installing an inflatable device within an annular chamber defined by the gas turbine engine, the inflatable device having a backbone and an inflatable bladder connected to the backbone, the inflatable bladder being formed of an expandable or foldable material, wherein installing the inflatable device within the annular chamber comprises:
guiding a free section of the backbone through a first access port of the gas turbine engine and circumferentially through the annular chamber, the free section of the backbone being a section of the backbone along which the inflatable bladder is not connected;
retrieving a portion of the free section of the backbone through a second access port of the gas turbine engine so that the portion of the free section is positioned external to the annular chamber; and
moving the inflatable device by performing at least one of pulling on the portion of the free section extending from the second access port external to the annular chamber and pushing on a portion of the inflatable device extending from the first access port external to the annular chamber so that the inflatable bladder extends annularly or traverses or extends at least two hundred seventy degrees(270°) through or around the annular chamber; and
inflating the inflatable bladder with an inflating fluid such that the inflatable bladder forms an annular seal within the annular chamber.

* * * * *

UNITED STATES PATENT AND TRADEMARK OFFICE
CERTIFICATE OF CORRECTION

PATENT NO. : 11,506,077 B2
APPLICATION NO. : 17/167435
DATED : November 22, 2022
INVENTOR(S) : Pritchard, Jr. et al.

It is certified that error appears in the above-identified patent and that said Letters Patent is hereby corrected as shown below:

In the Claims

Column 20, Claim 6, Line 44, delete "the range" and insert -- a range --, therefor.

Column 21, Claim 13, Line 13, delete "degrees)" and insert -- degrees --, therefor.

Signed and Sealed this
Thirty-first Day of January, 2023

Katherine Kelly Vidal
*Director of the United States Patent and Trademark Office*